US008622765B2

(12) United States Patent
Sulzer

(10) Patent No.: US 8,622,765 B2
(45) Date of Patent: Jan. 7, 2014

(54) CABLE CONNECTING DEVICE

(75) Inventor: Alexander Sulzer, Unlingen (DE)

(73) Assignee: Green Inno GmbH, Reutlingen (DE)

( * ) Notice: Subject to any disclaimer, the term of this patent is extended or adjusted under 35 U.S.C. 154(b) by 171 days.

(21) Appl. No.: 13/151,333

(22) Filed: Jun. 2, 2011

(65) Prior Publication Data
US 2011/0297442 A1 Dec. 8, 2011

(30) Foreign Application Priority Data

Jun. 8, 2010 (DE) .......................... 10 2010 022 970

(51) Int. Cl.
H01R 4/24 (2006.01)
(52) U.S. Cl.
USPC ......................................... 439/402; 439/936
(58) Field of Classification Search
USPC .......................................... 439/402, 403, 936
See application file for complete search history.

(56) References Cited

U.S. PATENT DOCUMENTS

| 3,118,715 | A | * | 1/1964 | Potruch ......................... 439/400 |
| 3,233,206 | A |   | 2/1966 | Fiala |
| 3,835,444 | A |   | 9/1974 | Plana et al. |
| 3,899,236 | A |   | 8/1975 | Santos |
| 3,923,362 | A | * | 12/1975 | Dunn et al. .................... 439/200 |
| 3,985,416 | A |   | 10/1976 | Dola et al. |
| 4,326,096 | A | * | 4/1982 | Leitmann .................... 174/84 R |
| 4,444,448 | A |   | 4/1984 | Silbbernagel |
| 5,080,606 | A |   | 1/1992 | Burkard |
| 5,199,899 | A | * | 4/1993 | Ittah ............................... 439/403 |
| 5,514,006 | A | * | 5/1996 | Getselis et al. ............... 439/417 |
| 5,562,478 | A |   | 10/1996 | Yamamoto |
| 5,733,139 | A |   | 3/1998 | Bray et al. |
| 5,762,517 | A |   | 6/1998 | Abe |
| 6,368,128 | B1 | * | 4/2002 | Backer et al. ................. 439/189 |
| 6,755,678 | B2 | * | 6/2004 | Ward et al. .................... 439/402 |
| 7,134,903 | B1 |   | 11/2006 | Pavlovic |
| 7,195,513 | B1 | * | 3/2007 | Gherardini et al. ........... 439/401 |
| 7,267,571 | B1 |   | 9/2007 | Twigg et al. |
| 7,435,128 | B2 | * | 10/2008 | Powell et al. ................. 439/403 |
| 7,611,374 | B1 | * | 11/2009 | Chiu .............................. 439/402 |
| 2002/0055295 | A1 | * | 5/2002 | Itai et al. ....................... 439/402 |
| 2011/0297442 | A1 | * | 12/2011 | Sulzer ......................... 174/88 R |
| 2012/0021637 | A1 | * | 1/2012 | Pirlo ............................ 439/391 |

FOREIGN PATENT DOCUMENTS

| DE | 30 09 675 | 9/1980 |
| DE | 44 13 977 | 10/1995 |
| DE | 44 42 673 | 6/1996 |
| DE | 199 08 468 | 9/2000 |
| DE | 10 2006 043 123 | 4/2007 |
| GB | 2 047 984 | 12/1980 |
| JP | 2001-155792 | 6/2001 |

* cited by examiner

Primary Examiner — James Harvey
(74) Attorney, Agent, or Firm — Michael J. Striker

(57) ABSTRACT

A cable connecting device has a housing and an electrically conductive bypass element; a first electrical line, which has an internal current-carrying core and an insulating covering, is routable through the housing of the cable connecting device via the bypass element in that the line can be inserted into at least one first recess of the bypass element, with the size of the first recess corresponding to or being slightly smaller than the diameter of the current-carrying core of the electrical line, and the bypass element has at least one second recess for at least one second electrical line, which has an internal current-carrying core and an insulating covering, with the size of the second recess being adapted to or slightly smaller than the cross-section of the current-carrying core of the second electrical line.

11 Claims, 4 Drawing Sheets

CABLE CONNECTING DEVICE

CROSS-REFERENCE TO RELATED APPLICATION

The invention described and claimed hereinbelow is also described in German Patent Application DE 10 2010 022 970.9 filed on Jun. 8, 2010. This German Patent Application, whose subject matter is incorporated here by reference, provides the basis for a claim of priority of invention under 35 U.S.C. 119(a)-(d).

BACKGROUND OF THE INVENTION

The invention relates to a cable connecting device with which an electrically conductive contact can be produced between two current-carrying lines. Cable connecting devices of this kind are used for an extremely wide array of fields in electrical engineering. For a few years now, cable connecting techniques have been used particularly often in the field of photovoltaics, in situations in which rows of individual solar panels are connected to one another in series and then connected to a main line.

There is an extremely wide variety of possible connections, depending on the embodiment of the solar collector system. So-called T-joints are frequently used, for example, when a series of solar panels is connected to the main line as described above, but cross connections (X connections) are another frequently used connection type.

When electric cable connections are used in the field of photovoltaics, especially the T-joint situated closest to the current infeed point of the solar collector system is subjected to particularly high loads due to the elevated current flow by comparison with the rest of the system. Also, the devices belonging to photovoltaic systems are exposed to extremely difficult environmental conditions. The temperatures can easily fluctuate from for example −5° C. to +40° C., solar radiation is unusually high, and the system and its components such as lines and connections are particularly exposed to humidity and frost.

Conventional connections, in particular the connections between individual solar panels, are frequently "crimped" or connected by means of a plug connector system. "Crimping" is understood to be a joining process in which two components are joined to each other by means of plastic deformation. A crimped connection is only partially detachable and is usually not repairable. Crimping is an alternative to conventional connections such as soldering or welding; crimped connections are usually used to attach the plug connector elements.

Soldered or welded connections or plug connectors are generally used in connection locations that are subjected to particularly high loads, e.g. in connection locations like the above mentioned T-joint situated closest to the current infeed point. In soldering, which like welding, is a thermal process for integrally joining materials, the electrical conductors are connected to each other by melting a solder (soldering).

Crimping, soldering, and welding, however, are not always suitable for use in photovoltaic systems. This is because photovoltaic systems are generally designed for a service life of 30 years, which is frequently the reason for early failure of the above-mentioned electrical connections.

In addition, soldering and welding share the fact that producing a soldered or welded connection requires an array of equipment such as soldering irons, solder, holding devices, and gas canisters, burners, etc. to be brought along. This is cumbersome and sometimes dangerous, particularly on roofs on which solar collector systems are typically installed. Soldered or welded connections also require insulation after the joining process, which is accomplished by means of heat-shrinking sleeves and the application of heat.

Fundamentally speaking, the use of this method is therefore comparatively expensive with regard to the required time and necessary logistics. This is not desirable either in a new installation of a photovoltaic system or when repairing electrical connections that have failed due to environmental influences and/or aging.

SUMMARY OF THE INVENTION

The object of the present invention, therefore, is to create a cable connecting device that makes it possible to produce a quick, reliable, in particular redundant, long-lasting, and simple electrical connection between lines.

The object is attained by a cable connecting device equipped with a housing and an electrically conductive bypass element; a first electrical line, which has an internal current-carrying core and an insulating covering, can be routed through the housing of the cable connecting device via the bypass element in that the line can be inserted into at least one first recess of the bypass element, with the size of the first recess corresponding to or being slightly smaller than the diameter of the current-carrying core of the electrical line, and the bypass element has at least one second recess for at least one second electrical line, which has an internal current-carrying core and an insulating covering, with the size of the second recess being adapted to or slightly smaller than the cross-section of the current-carrying core of the second electrical line.

The cable connecting device according to the invention can produce electrical connections between at least two lines in a simple way. This is accomplished first by simply inserting, in particular pressing, the first line into the first recess of the bypass element so that the edge region of the first recess cuts open the insulating covering of the first line and the bypass element comes into direct contact with the current-carrying core of the first conductor. To this end, a region of the first recess that accommodates the current-carrying core of the electrical line is embodied so that it is the same size as or slightly smaller than the diameter of the current-carrying core of the electrical line. Particularly if the diameter is slightly smaller, a pressing of the current-carrying core occurs so that the contact is produced in a particularly reliable fashion.

Then, the second line must be inserted, in particular pressed, into the second recess of the bypass element so that the edge region of the second recess cuts or slits open the insulating covering of the second line and as a result, the bypass element comes into electrical contact with the current-carrying core of the second conductor (and thus indirectly, also with the current-carrying core of the first conductor). With regard to the size of the second recess and the diameter of the current-carrying core of the second line, the same thing applies to the second line as to the first line. It is possible for the diameters of the first and/or second lines, particularly the diameters of the respective current-carrying cores, to be different from each other. It is also possible for the cable connecting device according to the invention to connect not only two lines, but three, four, or more lines; these lines can also basically have different-sized diameters of both the insulating covering and of the current-carrying core.

The housing electrically insulates the cable connecting device according to the invention and externally protects it from environmental influences. In comparison to conventional connecting techniques such as crimping, welding, or soldering, the cable connecting device according to the invention does not require a separate cutting tool in order to gain access to the current-carrying core of the respective lines. The cutting occurs only due to the pressing of the lines into the bypass element. This can be executed very easily and quickly and does not require any special safety precautions. The connection can always be adapted on-site. Naturally, the cable connecting device can be used as a current splitter.

In a preferred cable connecting device, the recesses for accommodating the current-carrying core of the lines have an essentially semicircular bottom. As a result, the recesses are as a rule adapted, at least on one side, to half of the circular shape of the line cross-section, in particular to the cross-section of the current-carrying core. As a result, particularly in the recesses that are slightly smaller than the diameter of the current-carrying cores, a uniform pressing from all sides occurs when the contact with the bypass element is produced. The pressing from all sides improves the contact between the core of the conductor and the bypass element, thus increasing the reliability of the connection and extending its service life.

In a particularly preferred modification of the above embodiment, the recesses have an insertion and cutting slot that narrows continuously in the direction from the recess openings toward the bottom of the recesses. The insertion and cutting slot cuts or slits open the insulating covering of a line when the line is pushed or pressed into a recess. The continuously narrowing shape of the slot allows the line to be inserted into the recess to produce the contact with the bypass element, even with only a slight exertion of pressure. It is therefore easy to cut plastics of which the insulating covering of the lines is typically composed. Typically, the insertion and cutting slot, just before it reaches the bottom of the recess, is embodied to be slightly narrower than a circular or semicircular bottom of the recess. As a result, the current-carrying core of the line engages in the recess bottom "in detent fashion" so to speak, once it is released from the insertion and cutting slot. This strengthens the hold of the line in the bypass element and therefore in the cable connecting device as a whole.

In another preferred embodiment of the cable connecting device, the bypass element is embodied as sharp-edged in the edge region of the recesses in order to cut open the insulating covering. In the context of this embodiment, the "edge region" of the recesses is in particular understood to mean the region of the insertion and cutting slot. A sharp-edged edge region also facilitates the slitting open and progressive separation of the insulating covering upon insertion of a line into the cable connecting device.

In another preferred embodiment, the bypass element has a front and rear recess for each electrical line. It is thus possible to implement a redundant contacting of a line with the bypass element, thus sharply increasing the contact reliability.

In a particularly preferred modification of the preceding embodiment, the bypass element is embodied in the shape of a frame; a front frame side of the bypass element is provided with front recesses and a rear frame side of the bypass element is provided with rear recesses. A frame-shaped design of the bypass element imparts increased stability and ruggedness primarily to the bypass element, but also to the housing connected to the bypass element. In addition, a cable connecting device embodied in this way is easier to grasp and is therefore easier to use.

In another preferred embodiment, the housing has two housing halves that can engage each other in detent fashion. Consequently, after insertion of the lines into the bypass element, the housing can be closed in a simple way, thus protecting the housing interior from external influences such as humidity, solar radiation, etc., primarily due to its insulating action. The housing halves can in particular be clipped to each other.

In a particularly preferred modification of the preceding embodiment, the housing halves can irreversibly engage each other in detent fashion. Then, the connection can only be changed by destroying the cable connecting device, in particular by destroying the housing. This informs the user whether the cable connecting device has been previously tampered with. The irreversible detent engagement more or less functions as a tamper-resistant closure of the cable connecting device.

In another preferred modification, a bypass element is provided for each housing half and when the housing halves engage each other in detent fashion, the bypass elements can press against the lines from all sides. In a cable connecting device embodied in this way, the current-carrying cores of the lines are completely enclosed by the recesses of the bypass elements. This and the pressure against the current-carrying core of the line make the electrical contact between the lines and the bypass elements particularly strong and reliable. The two bypass elements contact each other at least indirectly via the lines that respectively contact them both. As a rule, however, the two bypass elements also touch at other contact points inside the housing.

According to another preferred modification, the bypass elements have a detent element and a detent receptacle. As a result, independent of a possible reciprocal detent engagement via the current-carrying cores of the lines, the two bypass elements can also directly engage with each other in detent fashion, thus increasing the reliability of the cable connecting device.

In another modification, the housing halves and the bypass elements are embodied symmetrically. A symmetrical or mirror-image embodiment of the cable connecting device permits achievement of enormous cost savings in production. This is because the same molding, punching, or bending tools can be used both for the manufacture of the housing halves, for example using the injection molding technique, and for the manufacture of the bypass elements using a punching and/or bending technique. Furthermore, replacement parts are then easier to find and more probably available.

In a particularly preferred embodiment, the housing is provided with at least one entry opening and at least one exit opening for introducing a filler material into the housing interior. Consequently, after the lines to be connected have been inserted into the recesses of the bypass elements and the housing halves have been brought into detent engagement with each other, the housing interior can be filled with a filler material so that the contacting is closed and sealed in a fluid-tight and gas-tight fashion. Outside environmental influences are then prevented from penetrating into the interior of the cable connecting device. In particular, airborne humidity can cause neither corrosion of the exposed areas of the current-carrying core of the lines nor corrosion of the electrically conductive bypass element. The presence of an exit opening advantageously permits the air, which is initially contained inside the housing before the introduction of the filler material, to progressively escape during the introduction process, and also, by permitting the filler material to emerge easily, provides a visible indication of when the housing interior has been completely filled with the filler material.

In another preferred embodiment, the entry opening is situated centrally on the housing and the exit opening is situated in an outer region of the housing. In the context of this embodiment, an "outer region" is understood for example to mean an outer region situated remote from the center of the housing, e.g. the outer edge of the housing. Such a positioning of the entry opening and exit opening permits a favorable distribution of the filler material during the filling of the housing interior so that no air pockets or the like can be produced. All of the cavities in the closed housing are completely filled by the filler material. The filler material advantageously expands from the center toward all sides until it reaches the exit opening(s).

In another preferred embodiment, a pressurized hot melt adhesive functioning as a filler material can be injected into the detent-engaged housing. The introduction of hot melt adhesive as a filler material is inexpensive and imparts additional stability to the connection. For this reason, the use of this filler material has already proven its worth repeatedly in practice. To introduce the filler material into the housing interior in a short time, it is possible in a preferred embodiment for filler material to be injected from cartridges into the housing interior. For example, this can be carried out using a cartridge dispenser or the like.

Finally, it is preferable to use a cable connecting device according to one of the preceding embodiments to construct a photovoltaic system. The easy, reliable, and quick operation of the cable connecting device according to the invention is very advantageous when working on roofs or in otherwise hazardously exposed locations. The cable connecting device can also be used as a cable splitter device.

Other advantages of the invention ensue from the description and the drawings. According to the invention, the defining characteristics mentioned above and those that are explained in greater detail below can be used by themselves or can be united in a variety of combinations. The embodiments shown and described here should not to be construed to be an exhaustive list, but rather to be exemplary in nature, provided solely in order to illustrate the invention.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
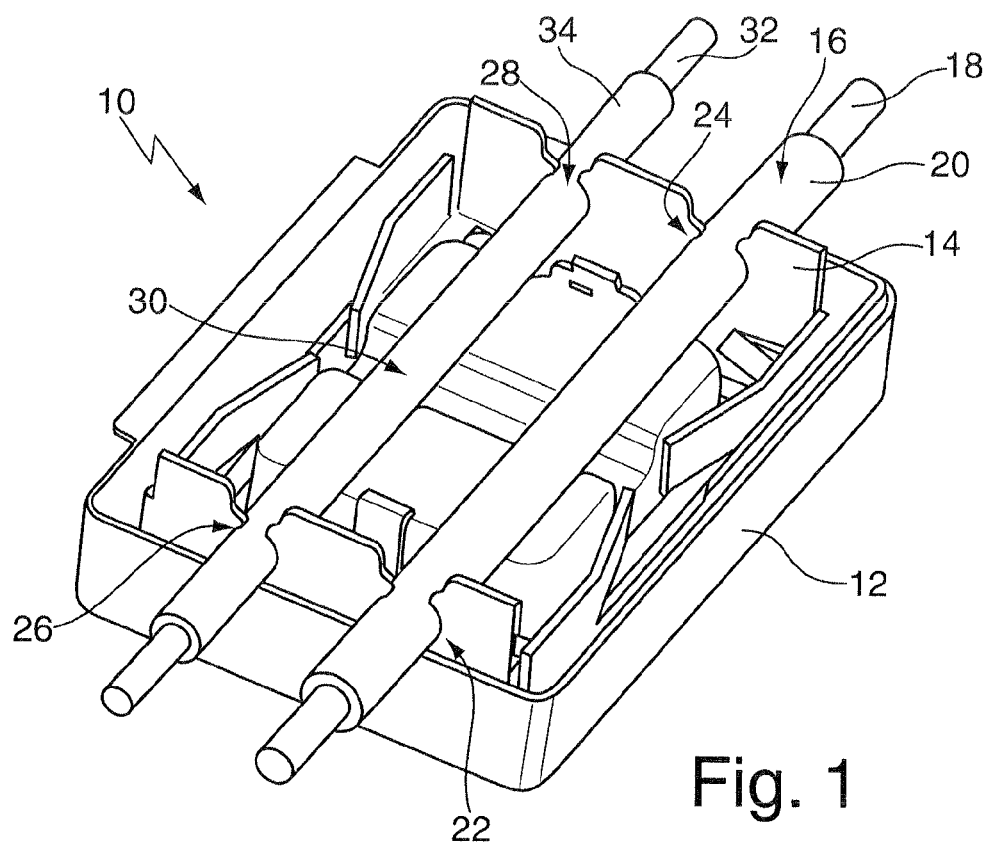
FIG. 1 is a perspective view of a first housing half of a cable connecting device according to the invention, with a bypass element and two lines.

FIG. 1 shows part of a cable connecting device 10 according to the invention. It has a housing half 12 and an electrically conductive bypass element 14; a first electrical line 16, which has an internal current-carrying core 18 and an insulating covering 20, is routed through the housing 12 of the cable connecting device 10 via the bypass element 14. To that end, the first line 16 is inserted into a first front recess 22 and a first rear recess 24 of the bypass element 14. The housing 12 is composed of plastic or a fiber composite material and the bypass element 14 is composed of an electrical conductor such as metal.

Figure 6:
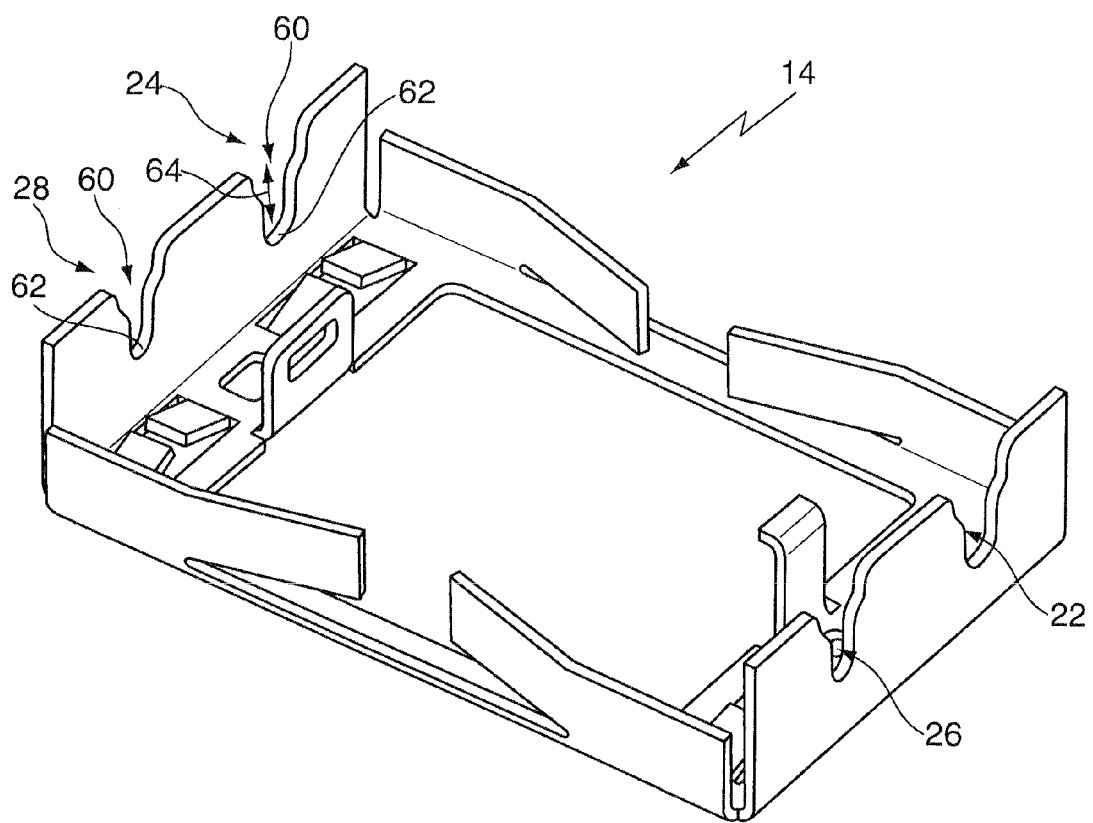
FIG. 6 is a perspective view of a bypass element according to the invention.

The size of the first front recess 22 and first rear recess 24 is slightly smaller than the diameter of the current-carrying core 18 of the first line 16 so that the core 18 fits snugly in the first front recess 22 and first rear recess 24, particularly in a respective recess bottom (see FIG. 6).

The bypass element 14 also has a second front recess 26 and a second rear recess 28 for a second electrical line 30; the second line 30 likewise includes an internal current-carrying core 32 and an insulating covering 34. The size of the second front recess 26 and rear recess 28, particularly the size of the recess bottom of the second front and rear recesses 26, 28, is slightly smaller than the cross-section of the current-carrying core 32 of the second electrical line 30.

Through the insertion or pressing of the first line 16 and second line 30 into their corresponding recesses 22, 24, 26, 28, the insulating coverings 20, 34 of the lines 16, 30 are cut open and the bypass element 14 touches or contacts the lines 16, 30 in the region of the recesses 22, 24, 26, 28 so that a very electrically conductive transition from the bypass element 14 to the lines 16, 30 and vice versa is produced.

Figure 2:
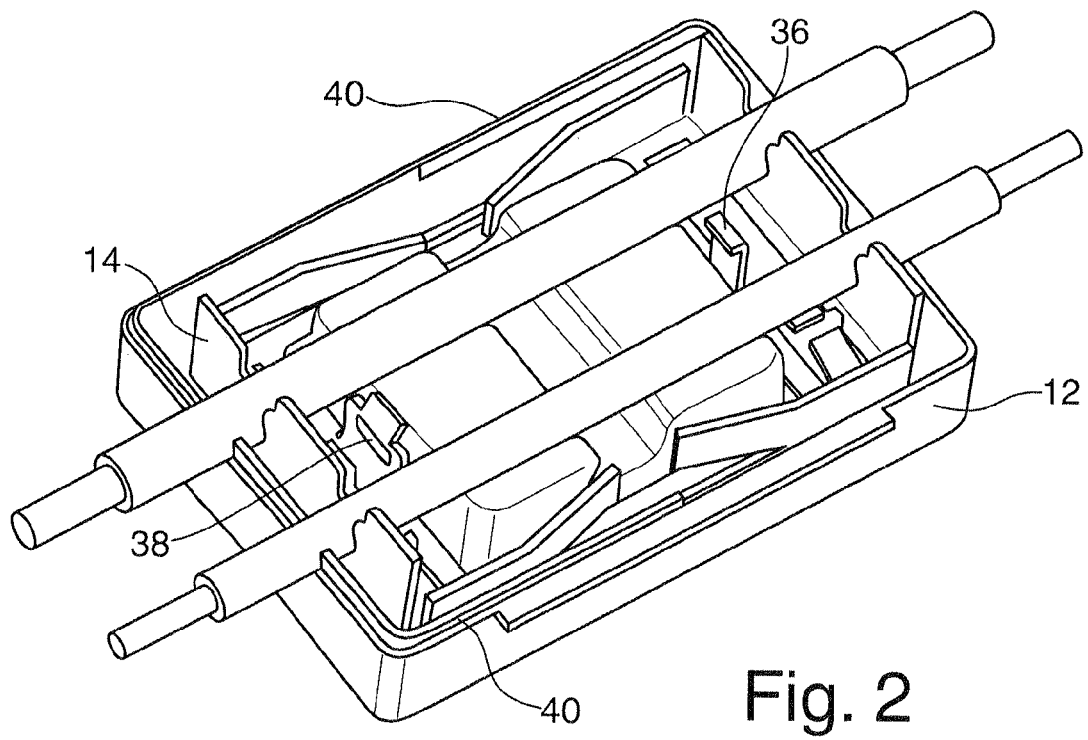
FIG. 2 shows the housing half from FIG. 1, from a position opposite the one in FIG. 1.

FIG. 2 shows the housing half 12 in FIG. 1 from a different perspective. Another housing half (shown in FIG. 3) can be placed onto, in particular irreversibly detent-engaged with, the housing half 12 by means of a detent element 36 of the bypass element 14 and a detent receptacle 38 of the bypass element 14. The housing half 12 also has an edge or border 40 for the reciprocal detent engagement.

Figure 3:
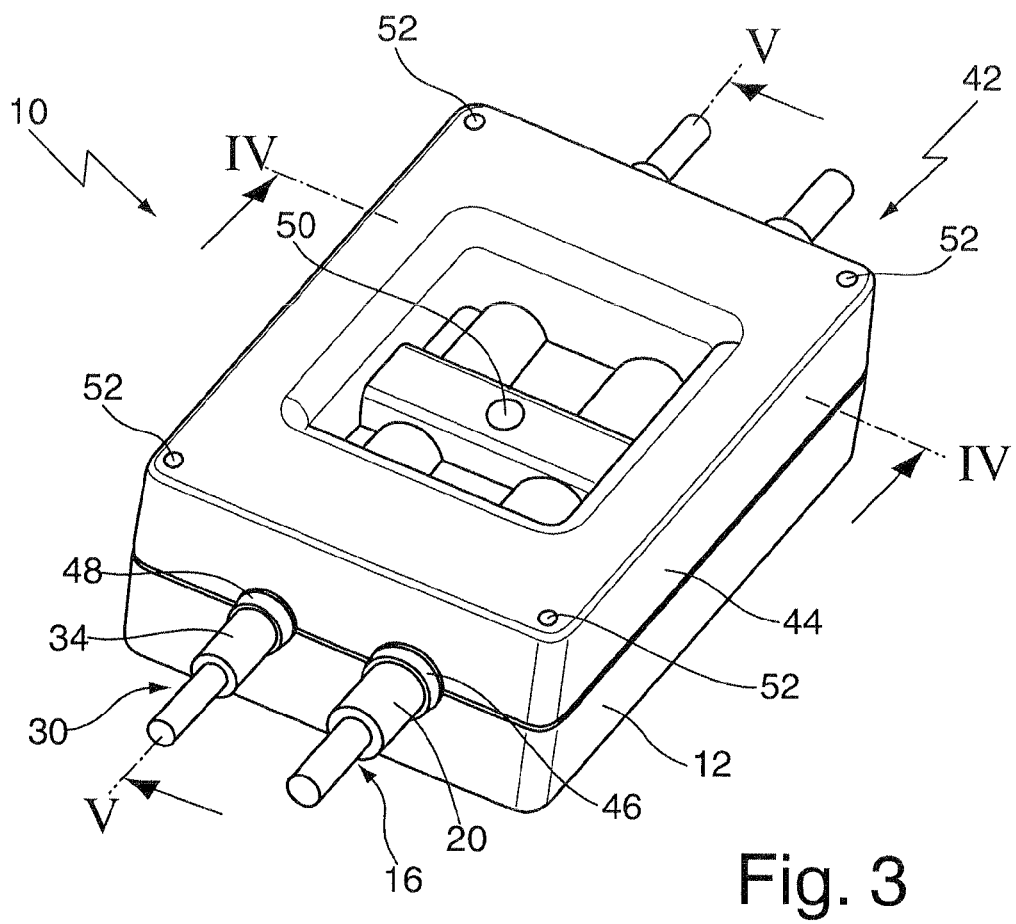
FIG. 3 shows the cable connecting device from FIG. 1, with a second housing half engaged in detent fashion with the first housing half.

FIG. 3 shows the housing 42 of the cable connecting device 10, which includes the first housing half 12 and a second housing half 44. The housing halves 12, 44 in this case are embodied identically or symmetrically. To accommodate the first, thicker line 16 and the second, thinner line 30, each housing half 12, 44 has edge collars 46, 48 formed onto it, which produce a sealed closure between the housing halves 12, 44 and the insulating coverings 20, 34 of the lines 16, 30. The border 40 and the edge collars 46, 48 are embodied so that the housing 42 is closed in a dust-tight and/or moisture-tight fashion when the housing halves 12, 44 are engaged with each other in detent fashion.

The second housing half 44 of the housing 42 also has a central entry opening 50 and four smaller exit openings 52 in an outer region of the housing 44 for introducing a filler material into the housing interior. By means of them, the cable connecting device 10 can be filled, for example, with a hot melt adhesive or the like.

Figure 4:
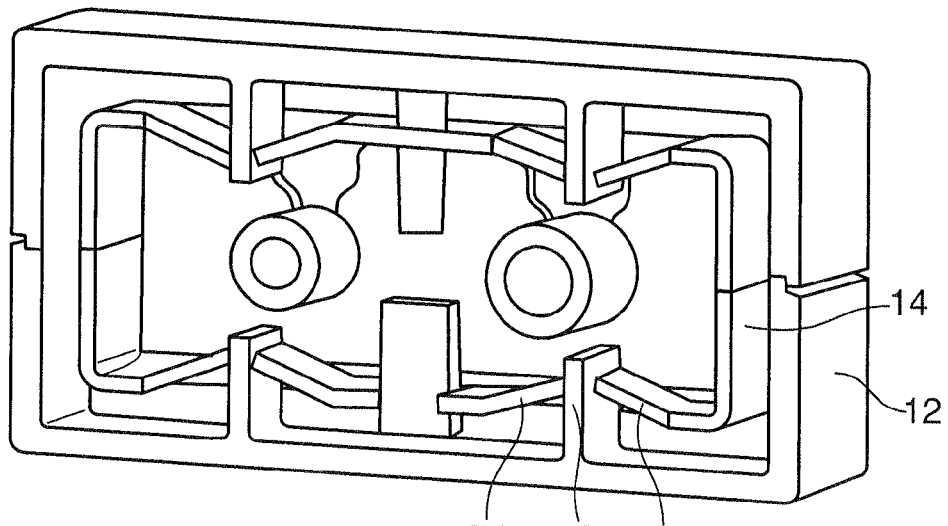
FIG. 4 is a perspective view of a cross-section through the cable connecting device according to FIG. 3, along the line IV-IV.

FIG. 4 is a perspective view of a cross-section through the cable connecting device according to FIG. 3, along the line IV-IV. It shows the clamping mechanisms for clamping the bypass element 14 to with the housing half 12. To produce the clamping action, the bypass element 14 has inclined barbs 54 into which the struts 56 of the housing half 12 can be inserted.

Figure 5:
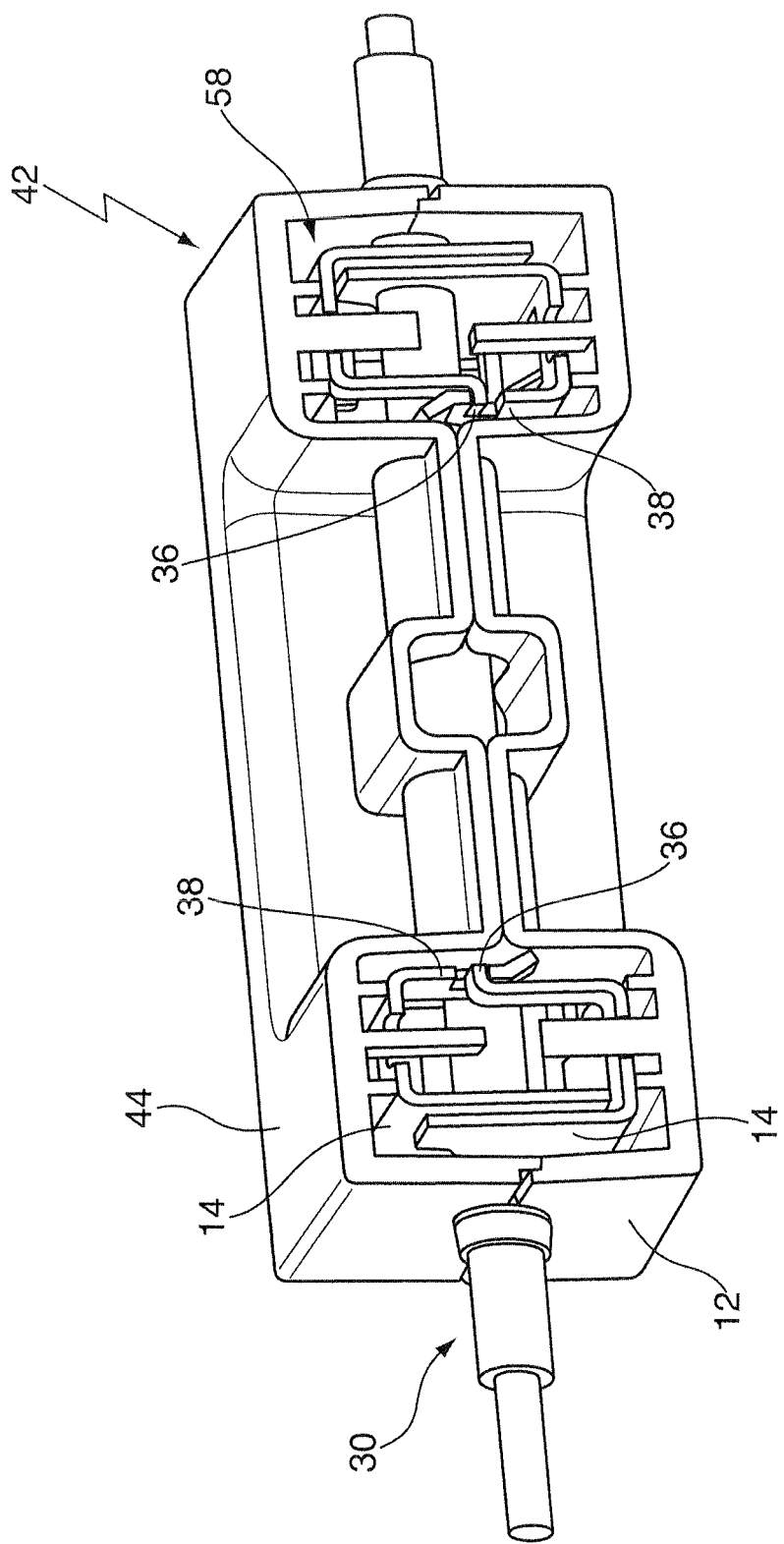
FIG. 5 is a perspective view of a cross-section through the cable connecting device according to FIG. 3, along the line V-V.

FIG. 5 is a perspective view of a cross-section through the cable connecting device according to FIG. 3, along the line V-V. It therefore shows the routing of the second line 30 through the housing 42. It also shows that a separate bypass element 14 is provided for each housing half 12, 44 and that the bypass elements 14 are irreversibly connected to each other by means of the detent element 36 and detent receptacle 38. In the depicted state in which the housing halves 12, 44 engage each other in detent fashion, the bypass elements 14 press against the second line 30 from all sides. The housing interior 58 (remaining cavities) is/are typically filled with a hot melt adhesive (hot melt glue) or the like.

FIG. 6 is a perspective view of the frame-shaped bypass element 14 without the housing halves. This improves the visibility of the first front and rear recesses 22, 24 and the second front and rear recesses 26, 28. The recesses 22, 24, 26, 28 have respective so-called insertion and cutting slots 64 extending from their recess openings 60 to a respective recess bottom 62. In the direction toward the recess bottom 62, which is essentially embodied as semicircular, these insertion and cutting slots narrow continuously in order to cut open the insulating covers of the lines as they are inserted and to assure a good electrically conductive contact. The edge regions of the insertion and cutting slots 64 are embodied as sharp-edged.

In summary, the invention relates to a cable connecting device 10 having a housing 42 and an electrically conductive bypass element 14; a first electrical line 16, which has an internal current-carrying core 18 and an insulating covering 20, can be routed through the housing 42 of the cable connecting device 10 via the bypass element 14 in that the line 16 can be inserted into at least one first recess 22, 24 of the bypass element 14, with the size of the first recess 22, 24 corresponding to or being slightly smaller than the diameter of the current-carrying core 18 of the electrical line 16, and the bypass element 14 has at least one second recess 26, 28 for at least one second electrical line 30, which has an internal current-carrying core 32 and an insulating covering 34, with the size of the second recess 26, 28 being adapted to or slightly smaller than the cross-section of the current-carrying core 32 of the second electrical line 30. The cable connecting device 10 according to the invention can be used to simply and quickly produce high-quality electrical connections between at least two lines 16, 30. The electrical connection is in particular electrically insulated and externally protected from environmental influences such as humidity, particularly when the housing interior 58 is filled with an insulating filler material.

It will be understood that each of the elements described above, or two or more together, may also find a useful application in other types of constructions differing from the types described above.

While the invention has been illustrated and described as embodied in a cable connecting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A cable connecting device, comprising a housing; an electrically conductive bypass element; a first electrical line, which has an internal current-carrying core and an insulating covering, is routed through the housing of the cable connecting device via the bypass element so that the line is inserted into at least one first recess of the bypass element, with a size of the first recess corresponding to or being slightly smaller than a diameter of the current-carrying core of the electrical line, and the bypass element has at least one second recess for at least one second electrical line, which has an internal current-carrying core and an insulating covering, with a size of the second recess being adapted to or slightly smaller than a cross-section of the current-carrying core of the second electrical line, wherein the housing has two housing halves engageable with each other in detent fashion, wherein the housing halves are irreversibly engageable with each other in the detent fashion, and wherein the bypass element is provided for each of the housing halves and when the housing halves engage each other in detent fashion, the bypass elements press against the lines from all sides, wherein the bypass elements have at least one detent element and at least one detent receptacle.

2. The cable connecting device as recited in claim 1, wherein the recesses have a substantially semicircular bottom for accommodating the current-carrying core of the lines.

3. The cable connecting device as recited in claim 2 wherein the recesses have an insertion and cutting slot that narrows continuously in a direction from recess openings to a bottom of the recesses.

4. The cable connecting device as recited in claim 1, wherein the bypass element is sharp-edged in an edge region of the recesses to cut open the insulating covering.

5. The cable connecting device as recited in claim 1, wherein the bypass element has the recesses which are front and rear recesses for each electrical line.

6. The cable connecting device as recited in claim 5, wherein the bypass element is shaped as a frame; a front frame side of the bypass element is provided with the front recesses and a rear frame side of the bypass element is provided with the rear recesses.

7. The cable connecting device as recited in claim 1, wherein the housing halves and the bypass elements are symmetrical.

8. The cable connecting device as recited in claim 1, wherein the housing is provided with at least one entry opening and at least one exit opening for introducing a filler material into a housing interior.

9. The cable connecting device as recited in claim 7, wherein the entry opening is situated centrally on the housing and the exit opening is situated in an outer region of the housing.

10. The cable connecting device as recited in claim 1, wherein the detent-engaged housing is configured so that a pressurized hot melt adhesive functioning as a filler material is injectable into the detent-engaged housing.

11. The cable connecting device as recited in claim 1, wherein the cable connecting device is a device configured for constructing a photovoltaic system.

* * * * *